(12) United States Patent
Buchner et al.

(10) Patent No.: US 11,228,588 B2
(45) Date of Patent: Jan. 18, 2022

(54) CALLBACK PATTERN FOR DID ATTESTATIONS

(71) Applicant: MICROSOFT TECHNOLOGY LICENSING, LLC, Redmond, WA (US)

(72) Inventors: Daniel James Buchner, Los Gatos, CA (US); Brandon Murdoch, Reading (GB); Ankur Patel, Sammamish, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 328 days.

(21) Appl. No.: 16/359,818

(22) Filed: Mar. 20, 2019

(65) Prior Publication Data

US 2020/0304498 A1  Sep. 24, 2020

(51) Int. Cl.
H04L 29/06 (2006.01)

(52) U.S. Cl.
CPC ...... *H04L 63/0869* (2013.01); *H04L 63/0421* (2013.01); *H04L 63/061* (2013.01); *H04L 63/0823* (2013.01)

(58) Field of Classification Search
CPC ............... H04L 63/0421; H04L 63/061; H04L 63/0823; H04L 63/0869; G06F 21/64; G06F 2221/2149; G06Q 30/0609
See application file for complete search history.

(56) References Cited

U.S. PATENT DOCUMENTS

| | | |
|---|---|---|
| 2017/0316390 A1 | 11/2017 | Smith et al. |
| 2018/0234433 A1 | 8/2018 | Oberhauser et al. |
| 2020/0044848 A1* | 2/2020 | Chari ...................... H04L 9/321 |

OTHER PUBLICATIONS

"International Search Report and Written Opinion Issued in PCT Application No. PCT/US20/017113", dated May 19, 2020, 12 Pages. (MS#405649-WO-PCT).

* cited by examiner

*Primary Examiner* — Olugbenga O Idowu
(74) *Attorney, Agent, or Firm* — Workman Nydegger

(57) ABSTRACT

Embodiments disclosed herein are related to computing systems, computer program products, and methods for providing a callback pattern for DID attestations or claims. An attestation is provided from a first entity of a decentralized network to a second entity of the decentralized network. The attestation defines information about an owner of the attestation that has been generated by the first entity and that is to be used by the second entity. The attestation includes contact metadata that defines how to contact the first entity. In response to the attestation being provided to the second entity, the first entity is contacted using the contact metadata.

20 Claims, 9 Drawing Sheets

CALLBACK PATTERN FOR DID ATTESTATIONS

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID may further include a DID method specifying how a client may register, replace, rotate, and/or recover a key. The DID method may also set a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems, computer program products, and methods for providing a callback pattern for DID attestations or claims. An attestation is provided from a first entity of a decentralized network to a second entity of the decentralized network. The attestation defines information about an owner of the attestation that has been generated by the first entity and that is to be used by the second entity. The attestation includes contact metadata that defines how to contact the first entity. In response to the attestation being provided to the second entity, the first entity is contacted using the contact metadata.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
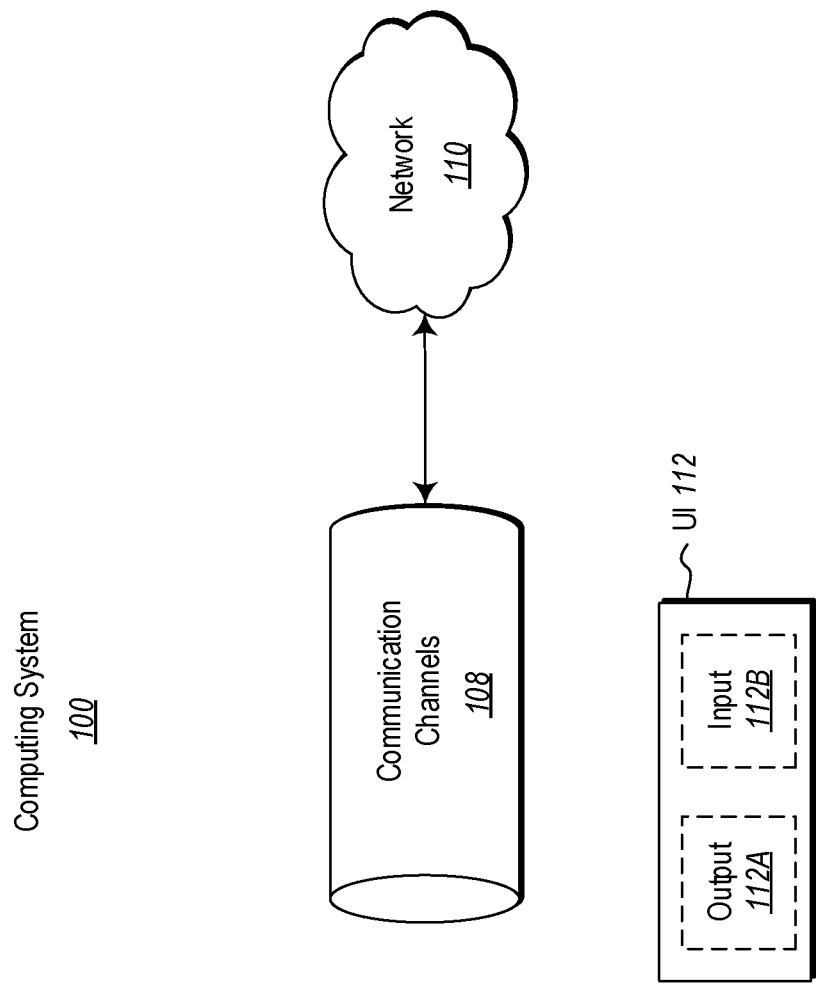
FIG. 1 illustrates an example computing system in which the principles described herein may be employed.

Embodiments disclosed herein are related to computing systems, computer program products, and methods for providing a callback pattern for DID attestations or claims. An attestation is provided from a first entity of a decentralized network to a second entity of the decentralized network. The attestation defines information about an owner of the attestation that has been generated by the first entity and that is to be used by the second entity. The attestation includes contact metadata that defines how to contact the first entity. In response to the attestation being provided to the second entity, the first entity is contacted using the contact metadata.

The embodiments disclosed herein provide a technical advance over conventional systems. For example, one embodiment disclosed herein allows an entity to make a record of how many times an attestation it has generated for an owner of the attestation is presented to another entity without the need to know the identity of the owner of the attestation. This allows the entity to negotiate discounts or other forms of value for the user without having to contact the owner of the attestation or know his or her identity. The owner of the attestation benefits as he or she is the beneficiary of the negotiated discount or other form of value while still keeping control of his or her identity. This process is not done in conventional decentralized systems.

In another embodiment, an entity is able to verify if an attestation that is presented to it by the owner of the attestation is still valid. This benefits the entity as it can know if the attestation is valid before interacting with the owner of the attestation. The owner of the attestation benefits as he or she is able to have the interaction with the entity once the entity is satisfied the attestation is still valid. In conventional systems, the entity that has the attestation presented to it has no easy way to determine if the attestation is still valid or if it has become invalid since it was generated. Thus, the entity may interact with the owner of the attestation when the attestation is invalid, which may not be desirable.

Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Decentralized Identification (DID)

Figure 2:
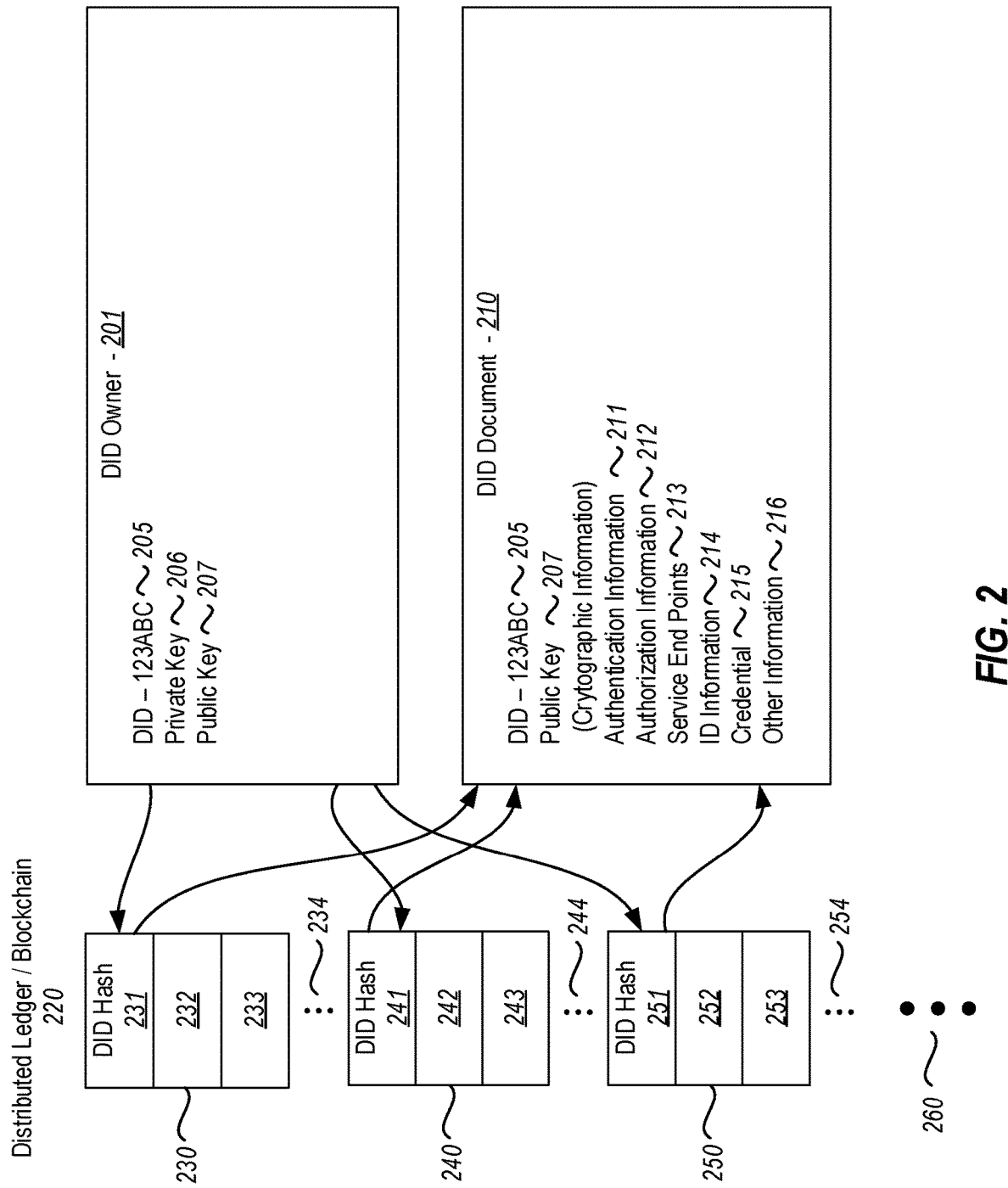
FIG. 2 illustrates an example environment for creating a Decentralized Identification (DID).

Some introductory discussion of a decentralized identification (DID) and the environment is which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource Identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein) Accordingly, the DID 205 may be any identifier that is under the control of the DID owner 201 and independent of any centralized authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. Thus, the private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child in no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed portion 230, a second distributed portion 240, a third distributed portion 250, and any number of additional distributed portions as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each portion of the distributed ledger or blockchain 220. For example, in FIG. 2 this is shown as the DID hash 231, DID hash 241, and DID hash 251, which are ideally identical copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID hash 231, DID hash 241, and DID hash 251 are written to the distributed ledger or blockchain 220. The distributed ledger or blockchain 220 thus records that the DID 205 now exits. Since the distributed ledger or blockchain 220 is decentralized, the DID 205 is not under the control of any entity outside of the DID owner 201. The DID hash 231, DID hash 241, and DID hash 251 may include, in addition to the pointer to the DID document 210, a record or time stamp that specifies when the DID 205 was created. At a later date when modifications are made to the DID document 210, this may also be recorded in DID hash 231, DID hash 241, and DID hash 251. The DID hash 231, DID hash 241, and DID hash 251 may further include a copy of the public key 207 so that the DID 205 is cryptographically bound to the DID document 210.

DID Lifecycle Management

Figure 3:
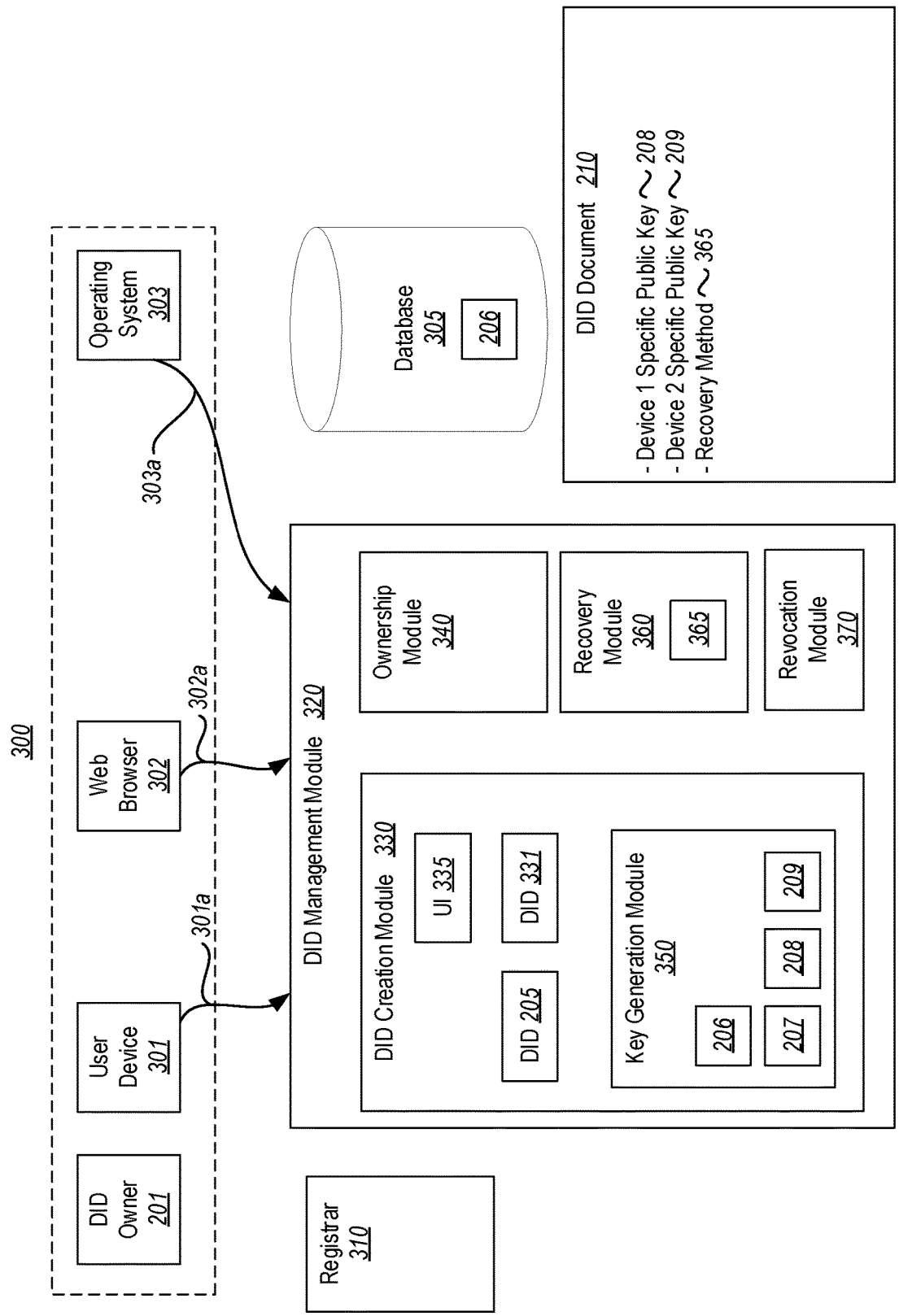
FIG. 3 illustrates an example environment for various DID lifecycle management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The devices 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifecycle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the hash generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

In one embodiment, the selected recovery mechanism may be stored as part of the DID document 210 as shown in FIG. 3. In such embodiments, when a recovery process is needed, the DID owner 201 may use the recovery module to access the recovery mechanism 365 from the DID document 210. The DID owner 201 may then provide the required information and the recovery mechanism 365 will recover the key. Specific embodiments of the recovery mechanisms 365 will described in more detail to follow.

In other embodiments, the selected recovery mechanism 365 may be stored in a secure storage, such as the database 305. Alternatively, the selected recovery mechanism 365 may be hosted by a third party such as the provider of the DID lifecycle management module 320. In such embodiments, the recovery module 360 may access the secure storage or the third party and may then provide the required information so that the key is recovered.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Decentralized Storage—Identity Hubs

Figure 4:
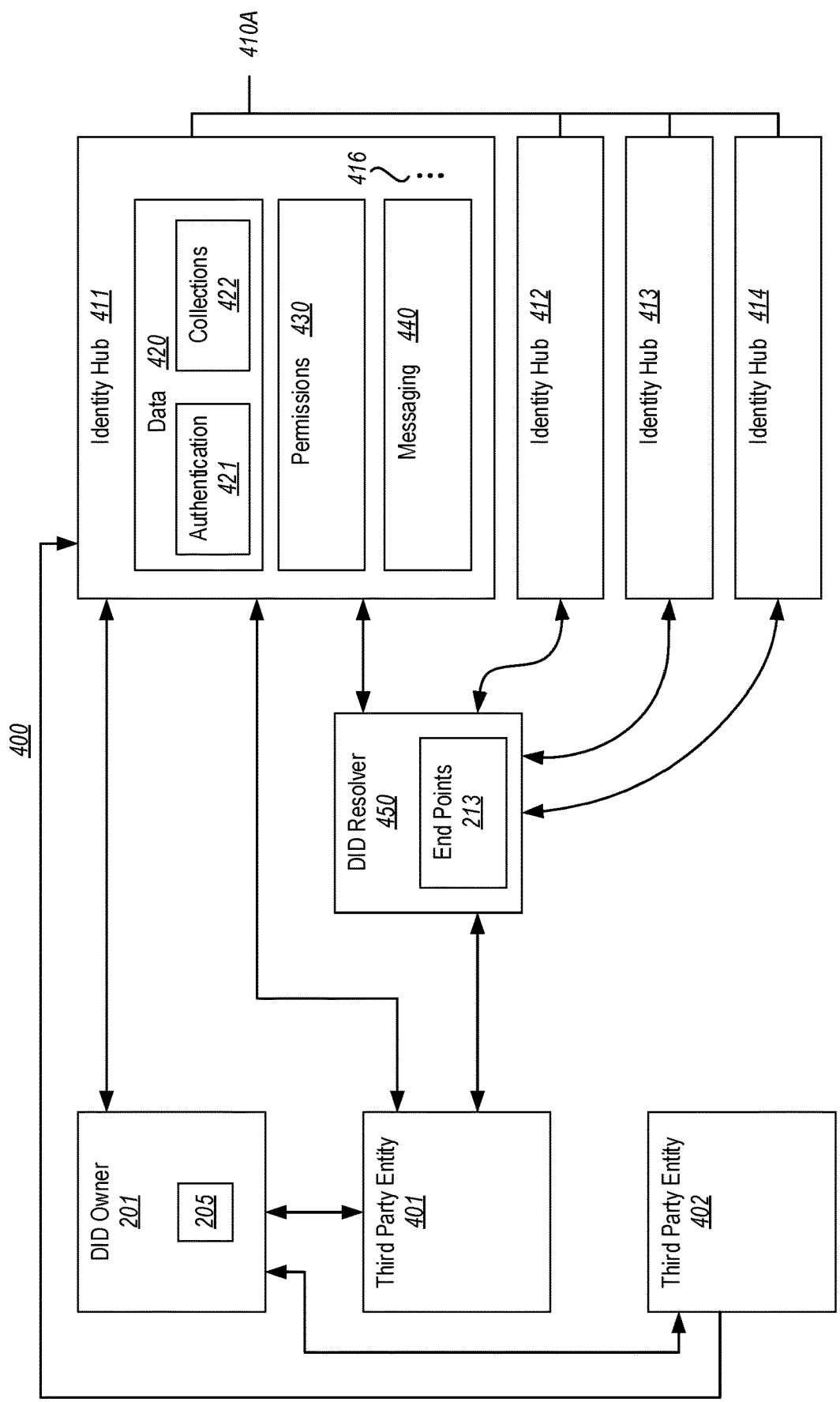
FIG. 4 illustrates example decentralized storage devices or identity hubs.

FIG. 4 illustrates an embodiment of an environment 400 in which a DID such as DID 205 may be utilized. Specifically, the environment 400 will be used to describe the use of the DID 205 in relation to one or more decentralized storage devices or identity hubs. It will be noted that FIG. 4 may include references to elements first discussed in relation to FIGS. 2 or 3 and thus use the same reference numeral for ease of explanation.

As illustrated in FIG. 4, the environment 400 includes various storage devices or identity hubs 410 that are associated with the DID owner 201. For example, the storage devices or identity hubs 410 may include a first identity hub 411, a second identity hub 412, a third identity hub 413, and a fourth identity hub 414. The ellipses 415 represent that that there may be any number of additional storage devices or identity hubs as circumstances warrant. It will be noted that the identity hubs 410 are considered to be decentralized storage devices in that, as will be explained in more detail to follow, the identity hubs are addressable through use of the DID 205 and its corresponding DID document 210. In addition, although the identity hubs may be hosted by a third party, all access to the identity hubs is based on permissions determined by the DID owner 201. The identity hubs 210 may correspond to the database 305 in some embodiments.

In one embodiment, the first identity hub 411 may be implemented at a first cloud storage provider, the second identity hub 412 may be implemented at a second cloud storage provider, the third identity hub 413 may be implemented as part of home computing system, and the fourth identity hub 414 may be implemented as part of a mobile device. Thus, the various identity hubs 410 may be implemented across different service providers such as the two different cloud storage providers. Further, the various identity hubs 410 may be implemented as a combination of storage provided by third parties such as the two cloud storage providers and memory devices owned by DID owner 201 such as the home computing system and mobile device.

Of course, the various identity hubs 410 may be implemented as other storage devices and services as circumstances warrant.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will provided as this description may also apply to the identity hubs 412-415. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may be any other type of data.

In one embodiment, the stored data may have different authentication and privacy settings 421 associated with the stored data. For example, a first subset of the data may have a setting 421 that allows the data to be publically exposed, but that does not include any authentication to the DID owner 201. This type of data may be for relatively unimportant data such as color schemes and the like. A second subset of the data may have a setting 421 that that allows the data to be publically exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may permission to any number of third parties to access a subset of the data 420. This will be explained in more detail to follow.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs. Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201, in some embodiments via the DID management module 320, asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 210.

Callback Pattern for DID Claim/Attestation Presentation

Figure 5:
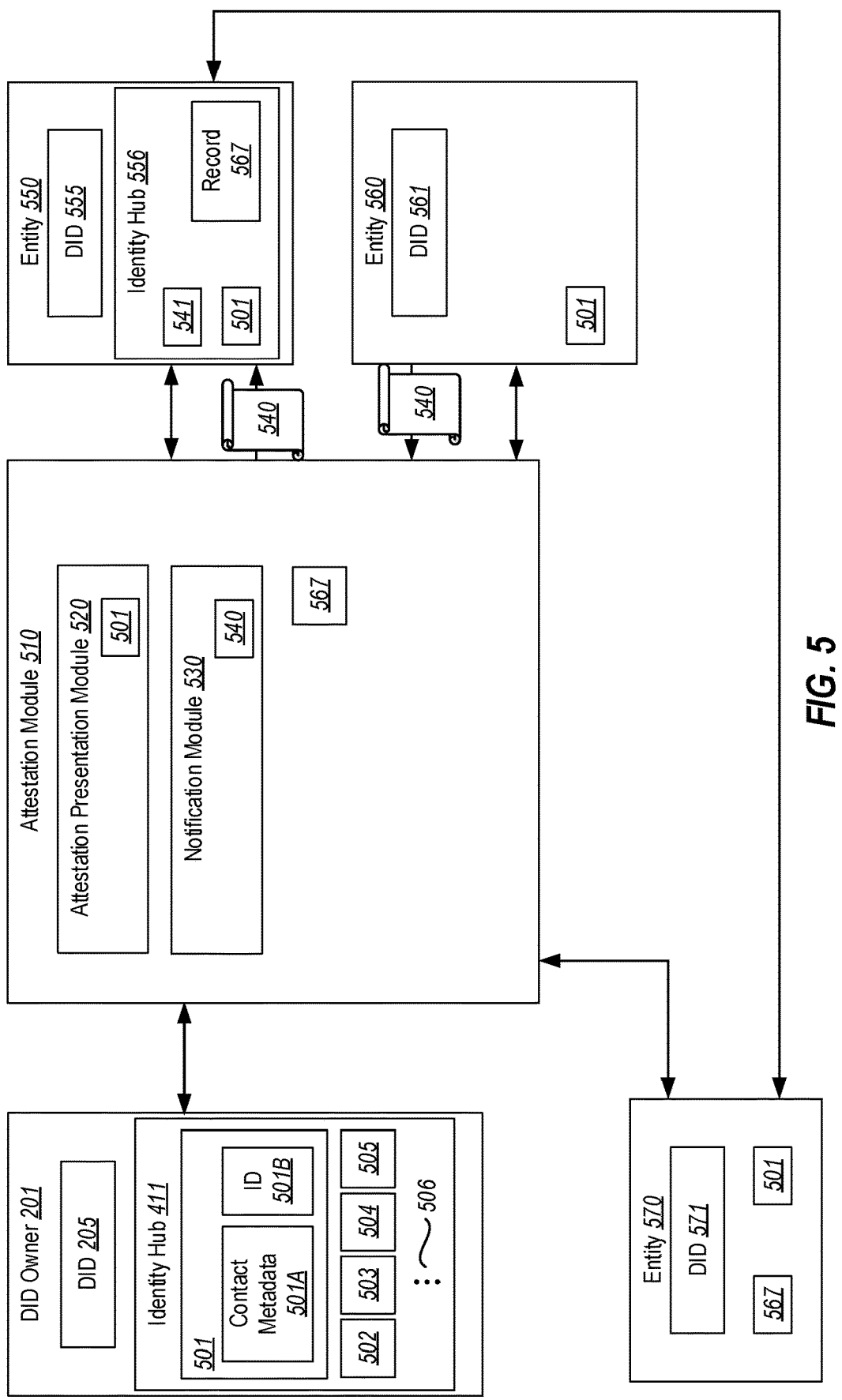
FIG. 5 illustrates an example environment for implementing a call back pattern for DID attestation or claim presentation.

FIG. 5 illustrates an embodiment of an environment 500 that will be used to describe a callback pattern for DID claim or attestation presentation. It will be noted that FIG. 5 may include references to elements first discussed in relation to FIGS. 2-4 and thus use the same reference numeral for ease of explanation.

As illustrated, the environment 500 includes an attestation module 510. In one embodiment, the attestation module 510 may be implemented by a third party such as the provider of the DID management module 320 and/or the identity hubs 410. In some embodiments, the attestation module 510 may be hosted on a server computer that is separate from the devices 301 owned by the DID owner 201. In other embodiments, the attestation module 510 may be part of DID management module 320 or may at least share some functions with the DID management module 320. In still other embodiments, the attestation module 510 may be part of or controlled by a third party entity such as an entity 550, 560, or 570.

A specific use embodiment of the attestation module 510 will now be described in relation to a callback pattern for DID claim/attestation presentation. For example, suppose that DID owner 201 was associated with an entity 550. The entity 550 may be any type of entity such as a company or an organization or even another human user. In the specific embodiment, it will be assumed that the entity 550 is a business association that the DID owner 201 is a member of.

The DID owner 201 may request a signed claim or attestation 501 from the entity 550 that verifies that the DID owner 201 is a member of the business association represented by the entity 550 and that the DID owner 201 meets the membership requirements of the business association. In one embodiment, the request may be made directly to the entity 550 by the DID owner 201, while in other embodiments the request may be made via the DID owner 201 first contacting the attestation module 510 and then having the attestation module 510 make the request to the entity 550.

The attestation 501 (and other attestations disclosed herein) may also be referred to as a signed claim, credential or verified credential such as the credential 215 of the DID document 210. That is, the attestation or verified credential may provide information about the DID owner 201 and/or about various entities the DID owner 201 has interactions with. For consistency of explanation, "attestation" will be the term used in the following discussion.

In response to the request for the attestation, the entity 550, which may have its own DID 555 that was created in the manner previously described, may create the attestation 501 related to verifying that the DID owner 201 is a member of the business association. In some embodiments, the attestation 501 may be a cryptographically protected pointer that points to a location of an identity hub 556 of the entity 550 where the membership information is held. The entity 550 may then use its public keys to digitally sign the attestation 501 to thereby verify that the entity 550 agrees that the DID owner 201 is a member of the business association.

In some embodiments, the attestation 501 may include various additional information besides the membership information that specifies that DID owner 201 is a member of the business association. For example, the attestation 501 may include contact metadata 501A that may be used by various parties to contact the entity 550 upon the presentation of the attestation 501 by DID owner 201 as will be explained in more detail to follow. That is, the contact metadata 501A may specify that the various parties send a notification to the entity 550 that the attestation 501 has been presented and may provide information for how to send the notification.

In addition, the attestation 501 may also include ID metadata 501B that specifies how the identity of the DID owner 201 is to be conveyed to the entity 550 in a notice from another entity as will be explained in more detail to follow. The ID metadata 501B may be added by DID owner 201 or it may be added by the entity 550 as circumstance warrant, although what is included in the ID metadata 501B will typically be controlled by the DID owner 201 so as to ensure that he or she maintains control over the use of his or her identity. For example, in one embodiment the ID metadata may include the DID 205. As previously described, the DID 205 may be used to access the DID document 210, where the DID owner 201 is able to provide as much or as little identifying information as he or she desires. Thus, in embodiments where the ID metadata 501B does include the DID 205, the DID owner 201 will typically not mind if the entity 550 knows that he or she presented the attestation 501 to an entity such as the entity 560 since the DID 205 is included in the ID metadata 501B.

Of course, in many instances, the DID owner 201 may not want for the entity 550 to know that he or she has presented the attestation 501 to an entity such as the entity 560. However, as will be explained in more detail to follow, it may still be advantageous to the DID owner 201 and to the entity 550 for the entity 550 to know that that the attestation 501 has been presented to the entity 560 without specifically knowing that the DID owner 210 is the owner or subject of the attestation 501.

Accordingly, in other embodiments, the ID metadata 501B may include a pseudonymous identification for the DID owner 201, such as pairwise identifier. In some embodiments, the pseudonymous identification may be based on one or more different DIDs that are owned by the DID owner 201 and that are created to be used as pseudonymous identifications. In this way, the actual identity of DID owner 201 may be protected.

In still other embodiments, the attestation 501 may not include the ID metadata 501B or any other identifier of the DID owner 201. As will be explained in more detail to follow, having the attestation 501 include no identifier of the DID owner 201 may allow the entity 550 to know that an attestation it has issued has been presented to another entity such as the entity 560 without knowing who owns the attestation.

The attestation module 510 may then request that DID owner 201 endorse or digitally sign the attestation 501 by using the public key 207. In this way, the DID owner 201 is able to verify that that he or she agrees with the membership information of the attestation 501 when providing the attestation 501 to other parties such as entity 560.

Although the disclosed embodiment is described in relation to providing an attestation 501 for membership in the business association represented by the entity 550, this process may also be performed in other scenarios. For example, an attestation (e.g., one or more of attestations 502, 503, 504, 505 or any number of additional attestations as shown by ellipses 506) may be generated by various third party entities that are related to one or more of a qualification, an achievement, a government ID, a government right such as a passport or a driver's license, a payment provider or bank account, a university degree or other educational history. It will be noted that any number of attestations may be generated about any number of subjects and thus the embodiments disclosed herein are not limited to any specific type or number of attestations.

The attestation 501 that is generated by the entity 550 on behalf of the DID owner 201 may be stored in the identity hub 411. Accordingly, the DID owner 201 may be considered to attestation 501 owner since the DID owner 201 is the subject of the attestation. In other words, the attestation 501 includes information that verifies that the DID owner 201 is a member in the business association represented by the entity 550.

In one embodiment, suppose that the entity 560, which may have its own DID 561, is a business that offers discounts on products or services (or offers some other form of value) to members of various business associations and that the business association represented by the entity 550 had previously negotiated the discount for its members with the entity 560. Accordingly, in such embodiments the DID owner 201 may desire to present the attestation 501 to the entity 560 to prove that he or she is a member of the business association represented by the entity 550 to thereby receive the negotiated discount.

Accordingly, attestation module 510 may include an attestation presentation module 520. In operation, the attestation presentation module 520 may receive the attestation 501 from the DID owner 201. Alternatively, the attestation presentation module 520 may access the attestation 501 from the identity hub 411. The attestation presentation module 520 may then provide the attestation 501 to the entity 560.

Upon receipt of the attestation 501, the entity 560 may read or otherwise operate on the attestation 501 and determine that the DID owner 201 is a member of the business association represented by the entity 550 based on the signed information from the entity 550. Accordingly, the entity 560 may know that the DID owner 201 may be eligible for the discount or other form of value negotiated between the entity 550 and the entity 560.

The entity 560 may also read or otherwise operate on the contact metadata 501A. As mentioned above, the contact metadata 501A may cause the entity 560 to generate an indication or notification 540 that specifies that the attestation 501 has been presented to the entity 560. In addition, the contact metadata 501A may include information that specifies how the notification 540 is to be sent to the entity 550.

As mentioned above, the attestation 501 may also include the ID metadata 501B that controls how the identity of the DID owner 201 is to be conveyed to the entity 550 in the notification 540. For example, in the embodiment where the ID metadata 501B included the DID 205, then the DID 205 may be included in the notification 540. In another embodiment, the ID metadata 501B may include the pseudonymous identification and this may be included in the notification 540. In still other embodiments, the attestation 501 may not include the ID metadata 501B and so no identification information is included in the notification 540.

The attestation module 510 include a notification module 530. In operation, the notification module 530 may receive the notification 540 and may then provide the notification 540 to the entity 550. The notification module 530 may use the contact metadata 501A to provide the notification 540 to the entity 550. Upon receipt of the notification 540, the entity 550 is able to know that the attestation 501 that is generated has been presented to the entity 560. In the embodiments where the notification 540 includes the DID 205, the entity 550 may be able to use the DID 205 to determine that the DID owner 201 is also the owner or subject of the attestation 501.

As mentioned above, in many instances the DID owner 201 may not want for the entity 550 to know that he or she had presented the attestation 501 to the entity 560. Thus, in those embodiments where the ID metadata 501B includes the pseudonymous identification or in those embodiments that do not include the ID metadata 501B, the notification module 530 may ensure that the notification 540 only includes the pseudonymous identification or does not include any identification information.

However, even though the notification 540 does not inform the entity 550 of who the owner of the attestation 501 is, the entity 550 may still find it useful to know that the attestation 501 was presented to the entity 560. For example, the entity 550 may keep a record 567 in its identity hub 556 of the number of times that the attestation 501 and any number of additional attestations that are generated on behalf of other members of the business association are presented to the entity 560 or to another entity. In some embodiments the record 567 may be generated by the attestation module 510 or at least stored by the attestation module 510.

The record 567 may then allow the entity 550 to negotiate better discounts or other form of value with the entity 560 or another entity on behalf of its members since the entity 550 will now have a count of how often the attestation 501 and any number of additional attestations that are generated on behalf of other members of the business association are presented to the entity 560 or to other entities. For example, as shown in FIG. 5 the entity 570, which may be a business that provides products or services and may have a DID 571, may receive the report 567 from the entity 550 or the attestation module 510. Upon learning the number of the business association members who are using an attestation such as the attestation 501 to interact with other entities such as the entity 560, the entity 570 may also desire to provide discounts or other forms of value to the members of the business association represented by the entity 550. Accordingly, the DID owner 201 may begin to present the attestation 501 generated by the entity 550 in future interactions so that the entity 570 may verify that the DID owner 201 is eligible for the discounts or other forms of value.

Accordingly, the embodiment allows for a notification that an attestation has been presented to an entity to be conveyed to the entity that generated the attestation without the need to specify the identification of the attestation owner. The entity that generated the attestation is then able to use this information to negotiate discounts or other forms of value for the attestation owner and other owners of attestations it has generated as a group.

Callback Pattern for DID Claim/Attestation Verification

Figure 6:
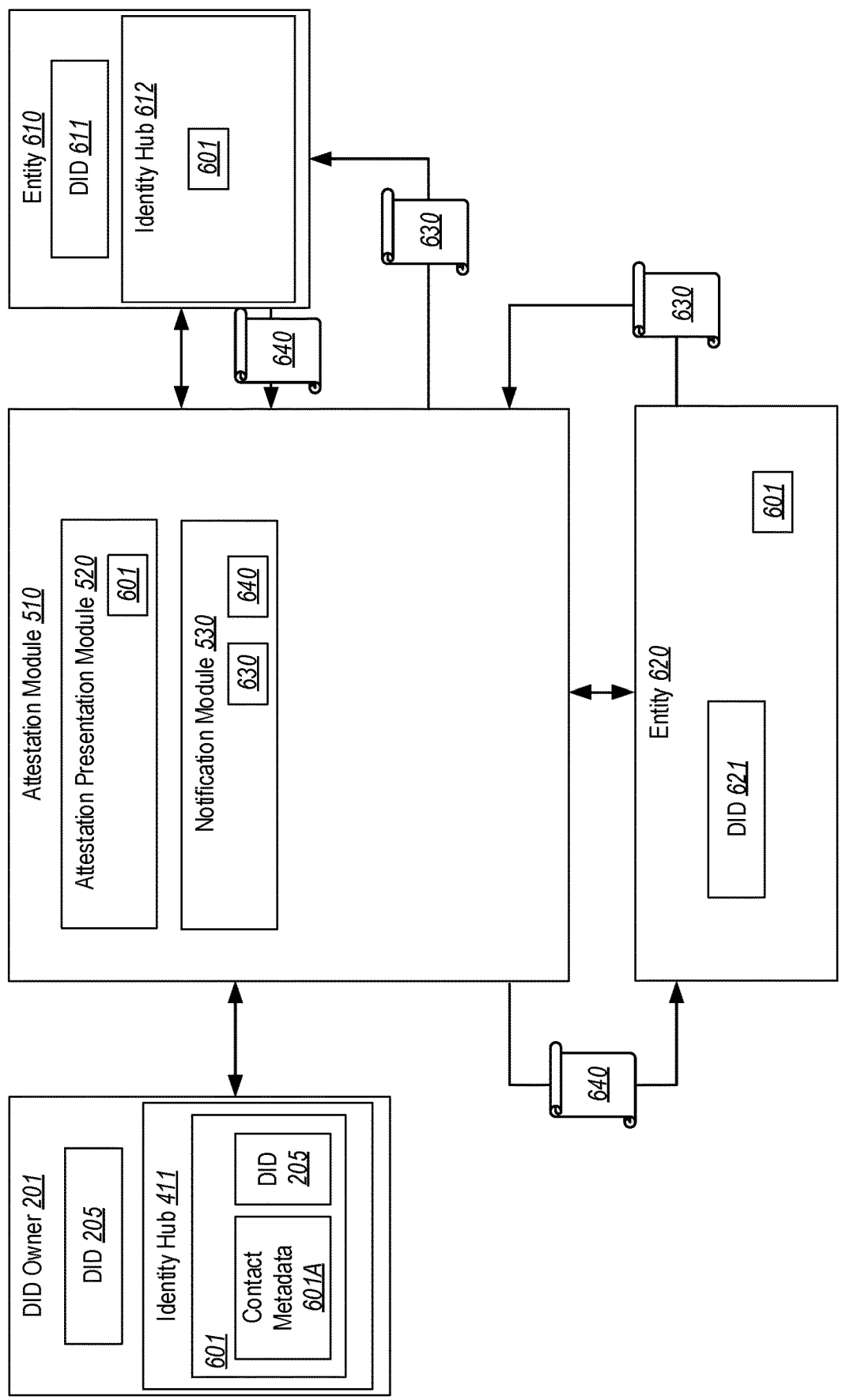
FIG. 6 illustrates an example environment for implementing a call back pattern for DID attestation or claim validation.

FIG. 6 illustrates an embodiment of an environment 600 that will be used to describe a callback pattern for DID claim or attestation verification. It will be noted that FIG. 6 may include references to elements first discussed in relation to FIGS. 2-5 and thus use the same reference numeral for ease of explanation. For example, the environment 600 include the attestation module 510, the attestation presentation module 520, and the notification module 530.

In an embodiment, suppose that the entity 610, which may have a DID 611, is a government body such as the Department of Motor Vehicles (DMV) that has issued a driver's license to the DID owner 201. Of course, it will be appreciated that the entity 610 may be any other type of entity previously discussed above in relation to the entity 550.

In the embodiment, the DID owner 201 may request a signed claim or attestation 601, which may correspond to the attestation 501 and thus include information about the DID owner 201 from the entity 610. In the present embodiment, the attestation 601 verifies that the DID owner 201 has a valid driver's license. In one embodiment, the request may be made directly to the entity 610 by the DID owner 201, while in other embodiments the request may be made via the DID owner 201 first contacting the attestation module 510 and then having the attestation module 510 make the request to the entity 610. In response to the request for the attestation, the entity 610 may create the attestation 601 that verifies that the DID owner 201 has a valid driver's license.

In some embodiments, the attestation 601 may include contact metadata 601A that may be used by various parties to contact the entity 610 upon the presentation of the attestation 601 by DID owner 201. As will be explained in more detail to follow, the contact metadata 601A may allow for an entity such as the entity 620 to contact the entity 610 to determine if the DID owner 201 still has a valid driver's license.

In addition, the attestation 601 may include the DID 205 or some other information that specifies the identification of the DID owner 201. In contrast to the embodiment where the attestation is only presented to an entity described previously in relation to FIG. 5, in the present embodiment the identification of the DID owner 201 is needs to be known so that the contact metadata can be used to validate the subject matter of the attestation 601. For example, in the present embodiment the identity of the DID owner 201 is needed so that it can be validated if his or her driver's license is still valid.

The attestation 601 that is generated by the entity 610 on behalf of the DID owner 201 may be stored in the identity hub 411. Accordingly, the DID owner 201 may be considered the attestation 601 owner since the DID owner 201 is the subject of the attestation. In other words, the attestation 601 includes information that verifies that the DID owner 201 has a valid driver's license.

In one embodiment, suppose that the entity 620, which may have its own DID 621, is a car rental business that rents cars to other parties such as the DID owner 201. Accordingly, in such embodiments the DID owner 201 may desire to present the attestation 601 to the entity 620 to prove that he or she has a valid driver license issued by entity 610 that is the DMV. Accordingly, the attestation presentation module 520 may receive the attestation 601 from the DID owner 201. Alternatively, the attestation presentation module 520 may access the attestation 601 from the identity hub 411. The attestation presentation module 520 may then provide the attestation 601 to the entity 620.

Upon receipt of the attestation 501, the entity 560 may read or otherwise operate on the attestation 601 and determine that the DID owner 201 at least at one time had a valid driver's license since the entity 610 that is the DMV has generated the attestation 601. However, some amount of time may have passed since the entity 610 that is the DMV issued the driver's license to the DID owner 201 or generated the attestation 601. During this time period, it is possible that the driver's license of the DID owner 201 has in some way become invalid. For example, the DID owner 201 may have had the driver's license revoked or it may have expired.

Accordingly, the entity 620 that is the car rental business may generate a request 630 that asks if the attestation 601 is still valid. In other words, the request 630 may request whether the attestation correctly verifies that the DID owner 201 has a valid driver's license. The request 630 may include the contact metadata 601A and the DID 205 or other identification information for the DID owner 201.

The notification module 530 may receive the request 630 from the entity 620. Using the contact metadata 601A, the notification module 530 may provide the request 630 to the entity 610 that is the DMV.

In response to receiving the request 630, the entity 610 may determine if the driver's license of the DID owner 201 is still valid and thus whether the attestation 601 is still valid. The entity 620 may then generate verification information 640. The verification information 640 may specify if the attestation 601 (and the driver's license of the DID owner 201) is still valid. Alternatively, if the driver's license of the DID owner 201 is no longer valid, the verification information 640 may specify that the attestation 601 is no longer valid.

The notification module 530 may then provide the verification information 640 to the entity 620. In the case where the verification information 640 specifies that the attestation 601 is still valid, the entity 620 may agree to rent a car to the DID owner 201 since this means that driver's license of the DID owner 201 is still valid. Conversely, in the case where the verification information 640 specifies that the attestation 601 is not still valid, the entity 620 may refuse to rent a car to the DID owner 201 since this means that the driver's license of the DID owner 201 is no longer valid.

Accordingly, the embodiment allows for a way to validate or verify if an attestation generated on behalf of the attestation owner by an entity is still valid. This allows those entities that have the attestation presented to them the ability to verify if the attestation and its underlying information about the attestation owner are still valid prior to doing business or some other interaction with the attestation owner.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
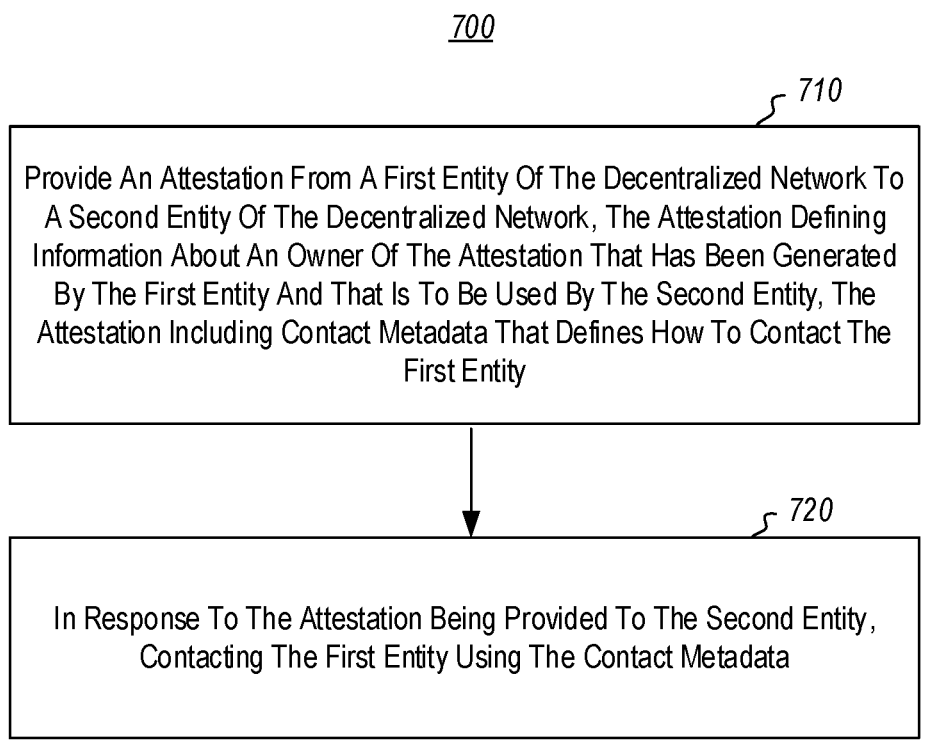
FIG. 7 illustrates a flow chart of an example method for providing a callback pattern for DID attestations or claims.

FIG. 7 illustrates a flow chart of an example method 700 for providing a callback pattern for DID attestations or claims. The method 700 will be described with respect to one or more of FIGS. 2-6 discussed previously.

The method 700 includes providing an attestation from a first entity of the decentralized network to a second entity of the decentralized network (710). The attestation defines information about an owner of the attestation that has been generated by the first entity and that is to be used by the second entity. The attestation includes contact metadata that defines how to contact the first entity.

For example, as previously described the entity 550 may generate the attestation 501 and the entity 610 may generate the attestation 601 that are used by the entities 560 and 620 respectively. The attestations 501 and 601 may include information about the DID owner 201, who is the attestation owner in the embodiments. In the case of the attestation 501, the information specifies that DID owner 201 is a member of a business association. In the case of the DID 601, the information specifies that the DID owner 201 has, or at least at one time had, a valid driver's license. The attestations 501 and 601 may also include contact metadata 501A and 601A respectively. In some embodiments, the attestations 501 and 601 may include ID metadata 501B and 601B as previously described.

The method 700 includes, in response to the attestation being provided to the second entity, contacting the first entity using the contact metadata (720). For example, as previously described the entity 560 or 610 may be contacted using the contact metadata when the attestation 501 or 601 is presented.

Figure 8:
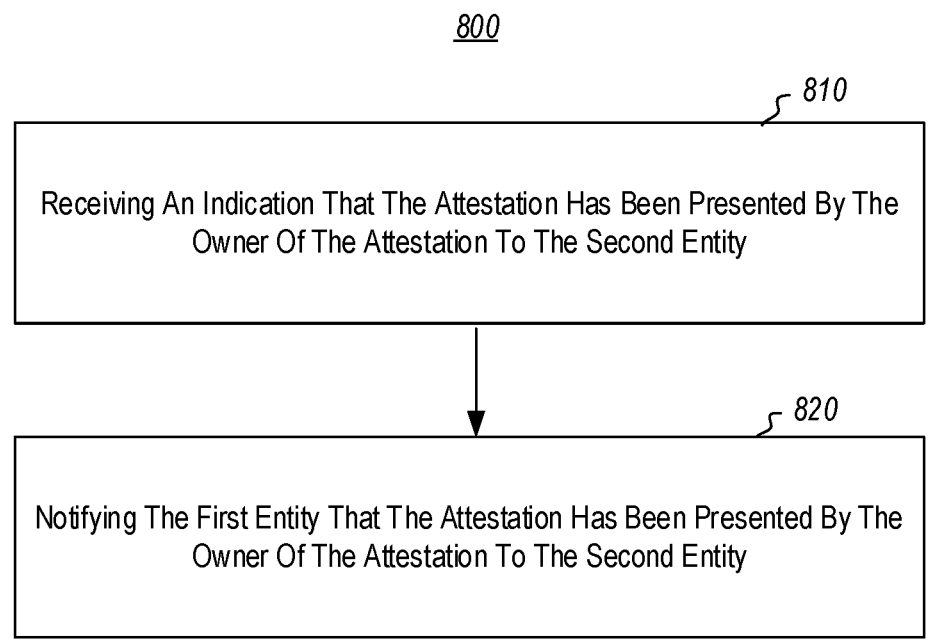
FIG. 8 illustrates a flow chart of an example method for contacting a first entity of the example method of FIG. 7.

In one embodiment shown in FIG. 8, contacting the first entity using the contact metadata includes a method 800 that includes receiving an indication that the attestation has been presented by the owner of the attestation to the second entity (810). For example, as previously described the attestation module 510 may receive the notification 540 from the entity 560 when the DID owner 201 presents the attestation 501 to the entity 560.

The method 800 includes notifying the first entity that the attestation has been presented by the owner of the attestation to the second entity (820). For example, as previously described the attestation module 510 may provide the notification 540 to the entity 560.

Figure 9:
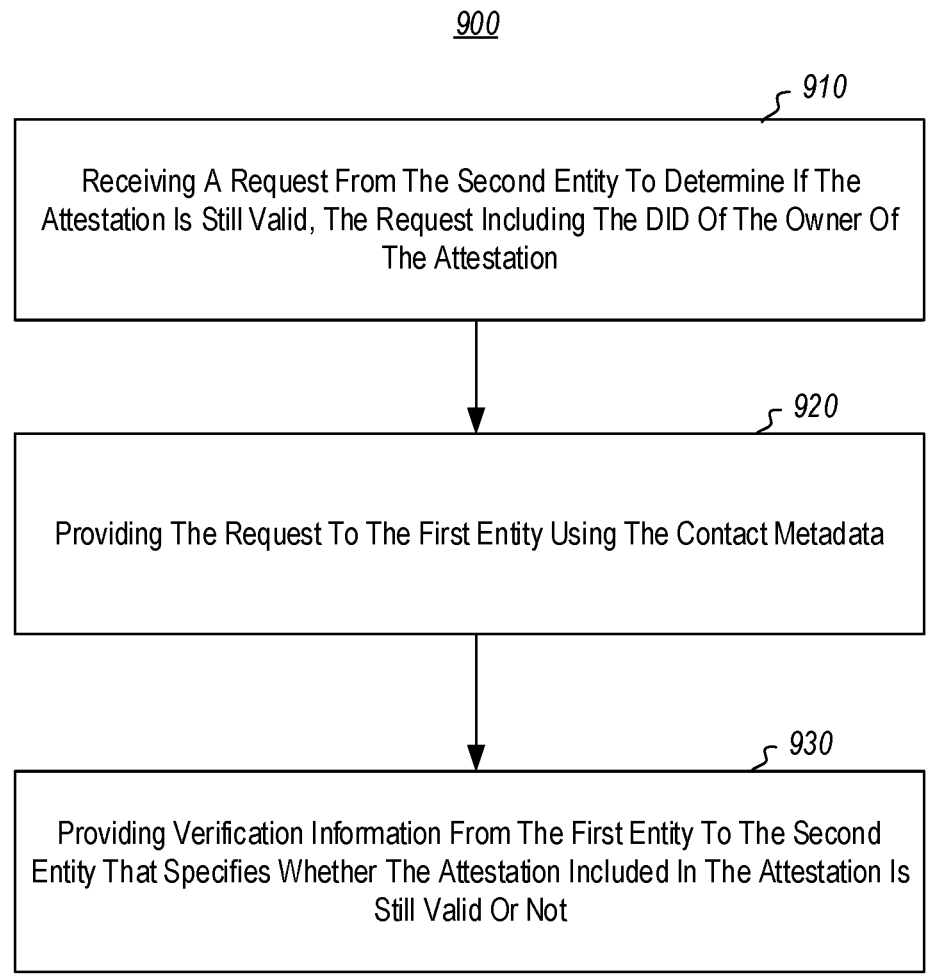
FIG. 9 illustrates an alternative flow chart of an example method for contacting a first entity of the example method of FIG. 7.

In another embodiment shown in FIG. 9, contacting the first entity using the contact metadata includes a method 900 that includes receiving a request from the second entity to determine if the attestation is still valid, the request including the DID of the owner of the attestation (910). For example, as previously described the attestation module 510 receives the request 630 from the entity 620.

The method 900 includes providing the request to the first entity using the contact metadata (920). For example, as previously described the attestation module 510 provides the request 630 to the entity 610 using the contact metadata 601A.

The method 900 includes providing verification information from the first entity to the second entity that specifies whether the attestation is still valid or not (930). For example, as previously described the attestation module 510 provides the verification information 640 from the entity 610 to the entity 620. The verification information 640 specifies whether the attestation is still valid or not.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system comprising:
   one or more processors; and
   one or more computer-readable hardware storage devices having thereon computer-executable instructions that are structured such that, when executed by the one or more processors, cause the computing system to:
   issue an attestation by a first entity, the attestation defining information about an owner of a decentralized identifier in the decentralized network and including contact metadata, that defines how the first entity can be contacted;
   provide the attestation from the owner of the decentralized identifier to a second entity; and
   in response to receiving the attestation by the second entity, cause a notification to be sent to the first entity using the contact metadata, such that the first entity, who has issued the attestation, is notified each time the attestation is presented to another entity by the owner of the decentralized identifier.

2. The computing system of claim 1, wherein contacting the first entity comprises:
   receiving an indication that the attestation has been presented by the owner of the attestation to the second entity; and
   notifying the first entity that the attestation has been presented by the owner of the attestation to the second entity.

3. The computing system of claim 2, further comprising:
   recording a number of times that the owner of the attestation presents the attestation to another entity.

4. The computing system of claim 1, wherein contacting the first entity comprises:
   receiving a request from the second entity to determine if the attestation is still valid, the request including the DID of the owner of the attestation;
   providing the request to the first entity using the contact metadata; and
   providing verification information from the first entity to the second entity that specifies whether the attestation included in the attestation is still valid or not.

5. The computing system of claim 1, wherein the attestation includes a DID of the owner of the attestation.

6. The computing system of claim 1, wherein the attestation includes a pseudonymous identification of the owner of the attestation.

7. The computing system of claim 1, wherein the attestation includes no identifier related to the owner of the attestation.

8. A method for providing a callback pattern for decentralized identifier (DID) attestations or claims, the method comprising:
   issuing an attestation by a first entity, the attestation defining information about an owner of a decentralized identifier in a decentralized network and including contact metadata that defines how the first entity can be contacted;
   providing the attestation from the owner of the DID to a second entity; and
   in response to receiving the attestation by the second entity, causing a notification to be sent to the first entity using the contact metadata, such that the first entity, who has issued the attestation, is notified each time the attestation is presented to another entity by the owner of the decentralized identifier.

9. The method of claim 8, wherein contacting the first entity comprises:
   receiving an indication that the attestation has been presented by the owner of the attestation to the second entity; and
   notifying the first entity that the attestation has been presented by the owner of the attestation to the second entity.

10. The method of claim 9, further comprising:
    recording a number of times that the owner of the attestation presents the attestation to another entity.

11. The method of claim 8, wherein contacting the first entity comprises:
    receiving a request from the second entity to determine if the attestation is still valid, the request including the DID of the owner of the attestation;
    providing the request to the first entity using the contact metadata; and
    providing verification information from the first entity to the second entity that specifies whether the information about the owner of the attestation included in the attestation is still valid or not.

12. The method of claim 8, wherein the attestation includes a DID of the owner of the attestation.

13. The method of claim 8, wherein the attestation includes a pseudonymous identification of the owner of the attestation.

14. The method of claim 8, wherein the attestation includes no identifier related to the owner of the attestation.

15. A computer program product comprising one or more computer-readable storage media having thereon computer-executable instructions that are structured such that, when executed by one or more processors of a computing system, cause the computing system to perform at least:
    issue an attestation by a first entity, the attestation defining information about an owner of a decentralized identifier in a decentralized network and including contact metadata that defines how the first entity can be contacted;
    providing the attestation from the owner of the decentralized identifier (DID) a second entity; and in response to receiving the attestation by the second entity, cause a notification to be sent to the first entity using the contact metadata, such that the first entity, who has issued the attestation, is notified each time the attestation is presented to another entity by the owner of the decentralized identifier.

16. The computer program product of claim 15, wherein contacting the first entity comprises:

receiving an indication that the attestation has been presented by the owner of the attestation to the second entity; and notifying the first entity that the attestation has been presented by the owner of the attestation to the second entity.

17. The computer program product of claim 15, wherein contacting the first entity comprises:

receiving a request from the second entity to determine if the attestation is still valid, the request including the DID of the owner of the attestation;

providing the request to the first entity using the contact metadata; and providing verification information from the first entity to the second entity that specifies whether the information about the owner of the attestation included in the attestation is still valid or not.

18. The computer program product of claim 15, wherein the attestation includes a DID of the owner of the attestation.

19. The computer program product of claim 15, wherein the attestation includes a pseudonymous identification of the owner of the attestation.

20. The computer program product of claim 15, wherein the attestation includes no identifier related to the owner of the attestation.

* * * * *

UNITED STATES PATENT AND TRADEMARK OFFICE
CERTIFICATE OF CORRECTION

PATENT NO. : 11,228,588 B2  
APPLICATION NO. : 16/359818  
DATED : January 18, 2022  
INVENTOR(S) : Daniel James Buchner et al.

Page 1 of 1

It is certified that error appears in the above-identified patent and that said Letters Patent is hereby corrected as shown below:

On the Title Page

<u>In Item (73), Assignee</u>  
Line 1, change "MICROSOFT TECHNOLOGLY LICENSING, LLC" to --MICROSOFT TECHNOLOGY LICENSING, LLC--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*